3,244,671
PRODUCTION OF PHENOLIC NOVOLAC RESINS
Alvin F. Shepard, Grand Island, N.Y., assignor to Hooker Chemical Corporation, Niagara Falls, N.Y., a corporation of New York
No Drawing. Filed May 13, 1963, Ser. No. 280,105
11 Claims. (Cl. 260—47)

This invention relates to a new and convenient and shortened process for making novolac resins. It further relates to novolac resins which are new in the art. It further relates to the discovery of reaction conditions which prevent the undesired and uncontrolled gelation or formation of useless, insoluble and infusible resinous materials, but which permit the maintenance of such resinous materials in a fusible state until such time as they are cross-linked and cured. By the term "novolac" is meant a phenolic resin, regardless of how formed, which is thermoplastic and which on addition of a source of methylene groups such as hexamethylene tetramine, paraformaldehyde, anhydroformaldehyde aniline or the like, is rendered thermosetting.

This application is a continuation-in-part of my copending application S.N. 714,020, filed Feb. 10, 1958, now abandoned which is a continuateion-in-part of application S.N. 456,313, filed Sept. 15, 1954, now abandoned.

Conventionally in the art, novolac resins are made by processes involving several operations:

I.  $CO + 2H_2 \rightarrow CH_3OH$
II. $2CH_3OH + O_2 \rightarrow 2CH_2O + 2H_2O$
III. Phenol Synthesis
IV. $4C_6H_5OH + 3CH_2O \rightarrow 3H_2O + novolac$ These novolac resins are then generally cured with hexamethylene tetramine to make a commercial resin or molding compound.

Intermediate the operations II and IV is the synthesis of phenol from benzene, an operation requiring two or more process steps, e.g., Raschig process:

(a)    $C_6H_6 + HCl + O \rightarrow C_6H_5Cl + H_2O$ and (b)    $C_6H_5Cl + H_2O \rightarrow C_6H_5OH + HCl$ or cumene process:

(a)    $C_6H_6 + C_3H_6 \rightarrow C_6H_5CH(CH_3)_2$
(b)    $C_6H_5CH(CH_3)_2 + O_2 \rightarrow C_6H_5C(CH_3)_2OOH$
(c)    $C_6H_5C(CH_3)_2OOH \rightarrow CH_3COCH_3 + C_6H_5OH$ As can be seen, therefore, there are generally five or six reaction steps in making novolacs.

It is an object of this invention to make novolac resins by a new and different process route from the foregoing described processes. It is a further object of this invention to make novolac resins by means of a process entailing only two reactions instead of the five or six reactions of the prior art. It is an additional object to prepare new and useful types of novolac resins. It is a further object of this invention to define the reaction conditions and reactants and the variations of these which are used and possible when carrying out the reactions of this invention. These and other objects will be readily apparent after a consideration of the present invention as set forth hereinafter.

It has now been found that novolac resins may be prepared by simply oxygenating certain starting materials to the hydroperoxide stage and then reacting the hydroperoxide with phenol under acidic conditions. Illustrative of this finding are the following typical reactions:

Process A.—The toluene route (a)
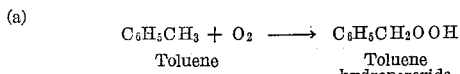

(b)
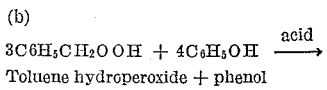

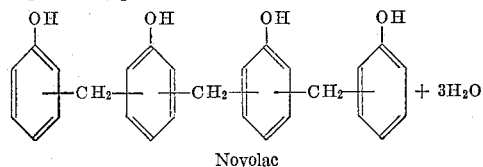

Process B.—The tetralin route (a)
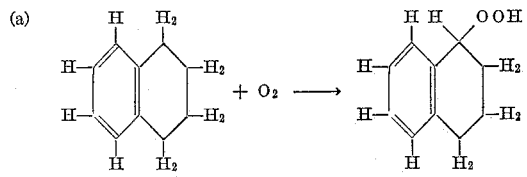

(b)
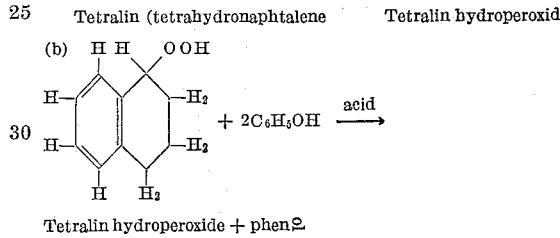

Tetralin hydroperoxide + phenol

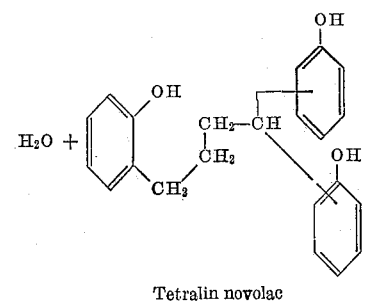

Process C.—The fluorene route (a)
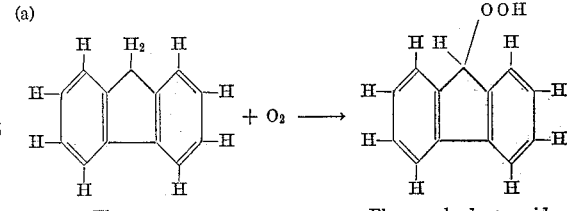

(b)
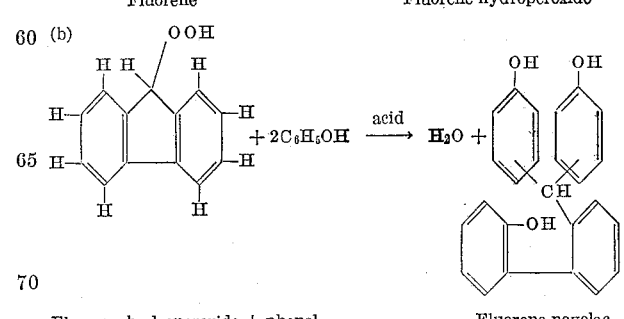

Fluorene hydroperoxide + phenol

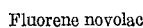

Fluorene novolac

Following is an explanation of the apparent mechanism of these reactions, which aids the understanding of the invention, but which is not intended to limit the invention. The hydroperoxide starting materials can be regarded as passing through intermediate stages. For example, toluene hydroperoxide may be regarded as forming the intermediate

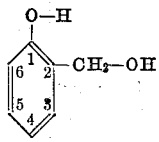

This intermediate is considered to be trifunctional in condensation reactions because of the reactivity inherent in the —CH$_2$OH— group and in the 4- and 6-positions of the ring.

Tetralin may be considered as forming the intermediate

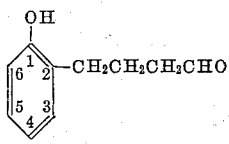

which intermediate is terafunctional in condensation reactions by virtue of being able to couple twice through the —CHO group and twice through the range at the 4- and 6- positions.

Similarly fluorene hydroperoxide may be thought of as giving

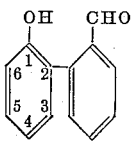

Again this intermediate is tetrafunctional in condensation reactions being capable of coupling twice through the —CHO group and twice through the ring in the 4- and 6- positions.

It will be noticed that all of the foregoing described decomposition reactions involved in the cleavage of hydroperoxides in phenols with acid catalysts. The art of cleaving hydroperoxides in phenols with acid catalysts to form a carbonyl compound plus the phenol corresponding to the hydroperoxide is elaborated on in S.N. 456,313, now abandoned. However, when the hydroperoxide to be cleaved is of the type such as the foregoing which yield the trifunctional or tetrafunctional intermediates, the intermediate which forms is so active that it can combine with itself. The product then is not a simple phenol but instead is a resin, resulting, for example, from the combination of the intermediate produced in the cleavage with itself. This resin so produced is, however, apt to be insoluble and infusible and useless for most commercial purposes.

It is a finding of this invention that if such hydroperoxides are cleaved in a substantial amount of phenol, the formation of such useless and insoluble and infusible resins is avoided. It has been further found that by carrying out the cleavage in the foregoing manner, it is possible to prepare fusible resins which cure with hexamethylenetetramine like phenol-formaldehyde novolacs. It has also been found that resins prepared by decomposing tetralin hydroperoxide give molding compounds comparing favorably with regular phenol-formaldehyde molding compounds.

For a further understanding of this invention, reference should be had to the following examples, wherein all parts are by weight and all temperature in degrees centigrade unless specified otherwise.

*Example 1*

Air was bubbled continuously from a fritted glass diffuser through 3500 grams of toluene (previously purified by distillation over sodium metal) for one hundred and twenty-four hours at 100 degrees centigrade. The toluene was contained in a glass reactor and was exposed to light from a 275 watt G.E. RS sun lamp. Analysis of the oxidation product by the sodium iodide method (Ind. Eng. Chem. Anal., Ed. 19, 976 (1947)) showed the presence of approximately 0.7 percent peroxide as toluene hydroperoxide. Distillation in vacuum gave 30 grams of a fraction b$_{40}$ 61–84 degrees which on redistillation at about 2 microns pressure gave a product having a boiling point 48.4–48.8 degrees centigrade, having a refractive index of n$_D^{25}$ 1.5339, and containing: C 66.1 percent, H 6.6 percent; calc. for C$_6$H$_4$CH$_2$O$_2$H; C 67.7 percent, H 6.45 percent. Reduction with Na$_2$SO$_3$ (Hock and Lang. Ber. 77B, 257–262 (1944)) gave benzyl alcohol, identified as benzyl 3,5-dinitrobenzoate melting point 114 degrees alone and in mixture with authentic material.

Example 2 shows the production of a useles insoluble and infusible resin when no phenol is used in the decomposition reaction of toluene hydroperoxide.

*Example 2*

A solution of 33 parts by weight of toluene hydroperoxide in 500 parts by weight of toluene were refluxed with about 1000 grams of 10 percent aqueous sulfuric acid until a resinous material separated from solution. On heating the resin to drive off toluene, it became insoluble and infusible.

Example 3 illustrates the preparation and process of this invention in making a useful novolac resin when using toluene hydroperoxide as a starting material.

*Example 3*

A solution of 50 parts by weight of toluene hydroperoxide and 25 parts by weight of phenol dissolved in 1700 parts toluene were refluxed with about 1000 parts of 10 percent aqueous sulfuric acid for thirty minutes. After separation of the aqueous acid and distillation of the toluene a novolac resin remained. The resin was brittle when cold and fusible when heated. The fusible resin after mixing with about 10–20 percent of its weight of hexamethylene tetramine was rendered curable. The molar ratio of reactants was 0.66 mole phenol per mole of toluene hydroperoxide.

The following Examples 4 to 6 illustrate the production of useless gelled resins when tetralin hydroperoxide is used as the starting material even though small amounts of phenol are used in the decomposition reaction.

*Example 4*

A solution of 12 grams tetralin hydroperoxide in about 88 grams of tetralin was mixed with 5 grams phenol and 1 gram H$_2$SO$_4$ (conc.). The temperature rose and the mixture was refluxed for about forty minutes. A gelled resin separated from the solution. The molar ratio of reactants was 0.73 mole phenol per mole of tetralin hydroperoxide.

*Example 5*

Example 4 was repeated using 10 grams of phenol in place of the 5 grams of that example. A similar gelled resin was obtained. The ratio of reactants was 1.45 moles phenol per mole tetralin hydroperoxide.

*Example 6*

Example 4 was repeated using 14.3 grams of phenol in place of the 5 grams of that example. A similar gelled resin was obtained. The ratio of reactants was 2.08 moles phenol per mole of tetralin hydroperoxide.

The following example illustrates the obtainment of a useful novolac resin based upon tetralin hydroperoxide when a sufficient amount of phenol is used in the reaction to prevent undesired gelation.

*Example 7*

A solution of 12 grams tetralin hydroperoxide in about 88 grams of tetralin was mixed with 30 grams of phenol A solution of 1 gram H₂SO₄ in 5 grams phenol was added to this mix and no gelled resin resulted. After removal of volatile material a fusible resin curable with hexamethylene tetramine and thus similar to a typical phenol-formaldehyde novolac was obtained. The ratio of reactants was 5.1 moles phenol per mole of tetralin hydroperoxide.

Example 8 shows the advantages of a resin made from tetralin hydroperoxide and phenol over a standard phenol-formaldehyde novolac. Resins produced by the reaction of tetralin hydroperoxide and phenol presumably contain a chain of three $CH_2$ groups derived from the hydrogenated ring of the tetralin and in consequence of this have a lower specific gravity and higher dielectric strength than standard phenol-formaldehyde novolacs.

Example 8

To a stirred mixture of 500 grams of a 26 percent solution of tetralin hydroperoxide in tetralin with 150 grams of phenol was slowly added a solution of 1 gram concentrated sulfuric acid in 25 grams of phenol. The temperature rose to 135 degrees and was held at this point for ten minutes. Two grams of powdered calcium hydroxide were then stirred into the mixture after which unreacted materials were distilled off up to a liquid temperature of 150 degrees centigrade at 20 millimeters pressure. There were thus obtained 207 grams of resin, 6 grams of water and 442 grams of organic distillate. The ratio of reactants was 2.35 moles phenol per mole of tetralin hydroperoxide.

A molding compound was prepared from the resin on the following formulation:

| | |
|---|---|
| Resin | 100 |
| Hexamethylenetetramine | 15 |
| Wood flour | 104 |
| Dye, lubricant, etc. | 10.4 |

This mixture was converted to molding compound by the standard procedure used for phenolics. Tests of the molding compound indicated it very similar to a compound prepared in identical manner from commercial phenol-formaldehyde novolac except that the tetralin hydroperoxide material had a substantially lower specific gravity and higher dielectric strength than the commercial material.

| | Tetralin Hydroperoxide Resin Molding Compound | Commercial Phenol-Formaldehyde Novolac Molding Compound |
|---|---|---|
| Specific gravity | 1.31 | 1.37 |
| Dielectric strength, v./mil ST | 400 | 325 |
| Dielectric strength, v./mil S/S | 306 | 250 |
| Appearance | Good | Good |
| Flexural strength, lb./in.² | 10,200 | 10,500 |
| Impact strength | 0.25 | 0.26 |
| Hardness | 111 | 115 |
| Power factor, 1,000 kc | 0.045 | 0.045 |
| Dielectric constant, 1,000 kc | 4.6 | 4.8 |

In a similar manner, the novolacs prepared from toluene and fluorene hydroperoxides can be compounded with hexamethylene tetramine, inert fillers, dyes and lubricants to produce useful molding compounds.

The following example illustrates the preparation of a useful novolac resin based upon fluorene hydroperoxide.

Example 9

A solution of 135 grams fluorene in 405 grams benzene was heated to 75 degrees and air was slowly passed through it from a fritted glass diffuser for 350 hours. The product contained 3.25 percent peroxide as fluorene hydroperoxide.

A 200 gram portion of the product was added dropwise with stirring to a mixture of 12.4 grams phenol and 100 cc. aqueous sulfuric acid maintained at 65–70 degrees over a three and one-half hour period. At the end of this time no peroxide was present in the mixture. The aqueous acid was then separated and the benzene and most of the fluorene were removed by heating in vacuum to 250 degrees. The product was a liquid resin which became brittle when cooled to room temperature. A mixture of the resin with hexamethylenetetramine was found to be thermosetting. The ratio of reactants was 4.0 moles of phenol per mole of fluorene hydroperoxide.

The various methods of making the novolac resins of this invention have been referred to as "Process A—The Toluene Route," "Process B—The Tetralin Route," and "Process C—The Fluorene Route," illustrating the making of useful resins based upon using toluene, tetralin and fluorene as the respective starting materials. It is to be understood, however, that these starting materials are only intended to be illustrative of the chief types of materials which may be used in practicing this invention, and are not to be interpreted as the only materials which can be used.

For example, some of the material which can be used in process A are those shown graphically below:

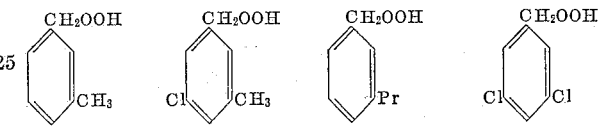

Some of the materials which can be used in process B are those depicted graphically below:

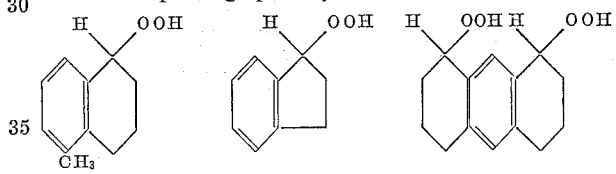

Some of the materials which can be used in process C are:

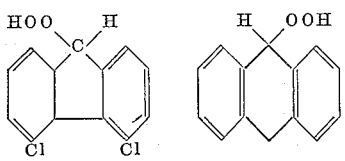

From the foregoing, it is apparent that the amount of phenol needed to successfully produce a novolac varies depending on the nature of the starting material and the functionality of the intermediates formed in the decomposition reaction. With toluene hydroperoxide a useful novolac can be obtained with as little as 10 mole percent phenol calculated on the hydroperoxide, i.e., 0.1 mole phenol per mole of hydroperoxide, and with up to 0.9 mole phenol per mole of hydroperoxide; preferably the ratio is from about 0.1 to 0.7 mole phenol per mole of hydroperoxide. With tetralin hydroperoxide which, as mentioned previously, has a higher functionality, it is necessary in general to use more phenol. As shown in the foregoing examples the ratio of reactants can vary between about 2.2 and about 6 moles of phenol per mole of tetralin hydroperoxide to produce useful novolac products. Even higher ratios can be used if desired. Fluorene hydroperoxide, which also has a higher functionality, behaves much like tetralin hydroperoxide, so that useful novolac resin products can be made using ratios of reactants between about 2.2 and 6 or more moles of phenol per mole of fluorene hydroperoxide.

Frequently, it is convenient to employ the crude hydrocarbon oxidation product directly in the resin preparation step without intermediate purification of the hydroperoxide.

The reaction temperature is preferably between about 50 and 150 degrees centigrade. However, higher temperatures up to 180 degrees can be used at atmospheric pressure. Even higher temperature, for example, up to 200 degrees can be employed if super-atmospheric pressures are employed.

Among the acid catalysts that can be utilized in the reaction process are sulfuric acid, hydrogen chloride, hydrogen bromide, aluminum chloride, p-toluene sulfonic acid monohydrate, and phenol sulfonic acid.

It is to be understood that the invention is not limited to the specific examples which have been offered merely as illustrative and that modifications may be made without departing from the spirit of the invention.

I claim:

1. A novolac resin prepared by the process which comprises reacting tetrahydronaphthalene hydroperoxide with phenol in the presence of an acid catalyst at a ratio of about 2.2 to 6.0 moles of said phenol per mole of tetrahydronaphthalene hydroperoxide.

2. The novolac resin of claim 1 when cured with hexamethylenetetramine.

3. A molding composition comprising the novolac resin of claim 1, hexamethylenetetramine and an inert filler.

4. A novolac resin prepared by the process which comprises reacting fluorene hydroperoxide with phenol in the presence of an acid catalyst at a ratio of about 2.2 to 6.0 moles of said phenol per mole of fluorene hydroperoxide.

5. The novolac resin of claim 4 when cured with hexamethylenetetramine.

6. A molding composition comprising the novolac resin of claim 4, hexamethylenetetramine and an inert filler.

7. A process for preparing a novolac resin which comprises reacting toluene hydroperoxide with phenol in the presence of an acid catalyst at a ratio of 0.1 to 0.9 mole of said phenol per mole of toluene hydroperoxide.

8. The process wherein the novolac resin of claim 7 is cured with hexamethylenetetramine.

9. The process wherein the novolac resin of claim 7 is mixed with hexamethylenetetramine and an inert filler to produce a molding composition.

10. A process for preparing a novolac resin which comprises reacting tetrahydronaphthalene hydroperoxide with phenol in the presence of an acid catalyst at a ratio of about 2.2 to 6.0 moles of said phenol per mole of tetrahydronaphthalene hydroperoxide.

11. A process for preparing a novolac resin which comprises reacting fluorene hydroperoxide with phenol in the presence of an acid catalyst at a ratio of about 2.2 to 6.0 moles of said phenol per mole of fluorene hydroperoxide.

References Cited by the Examiner

UNITED STATES PATENTS 2,669,588   2/1954   Deming _____ 260—47

FOREIGN PATENTS 944,032   6/1956   Germany.

OTHER REFERENCES

Martin: The Chemistry of Phenolic Resins, John Wiley and Sons, p. 153 (1956).

Carswell: Phenoplasts, pp. 29–33, Interscience, New York (1947).

WILLIAM H. SHORT, *Primary Examiner.*

JOHN C. MARTIN, *Assistant Examiner.*